US012482142B2

(12) United States Patent
Taquet et al.

(10) Patent No.: US 12,482,142 B2
(45) Date of Patent: Nov. 25, 2025

(54) METHOD AND APPARATUS OF ENCODING/DECODING POINT CLOUD GEOMETRY DATA CAPTURED BY A SPINNING SENSORS HEAD

(71) Applicant: BEIJING XIAOMI MOBILE SOFTWARE CO., LTD., Beijing (CN)

(72) Inventors: Jonathan Taquet, Beijing (CN); Sebastien Lasserre, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 275 days.

(21) Appl. No.: 18/286,059

(22) PCT Filed: Oct. 13, 2021

(86) PCT No.: PCT/CN2021/123662
§ 371 (c)(1),
(2) Date: Oct. 6, 2023

(87) PCT Pub. No.: WO2022/213569
PCT Pub. Date: Oct. 13, 2022

(65) Prior Publication Data
US 2024/0185466 A1    Jun. 6, 2024

(30) Foreign Application Priority Data

Apr. 9, 2021    (EP) ..................... 21305459

(51) Int. Cl.
*G06T 9/00*    (2006.01)
(52) U.S. Cl.
CPC .................. *G06T 9/001* (2013.01)

(58) Field of Classification Search
None
See application file for complete search history.

(56) References Cited

U.S. PATENT DOCUMENTS

| | | | |
|---|---|---|---|
| 11,514,610 B2* | 11/2022 | Gao | G06T 9/00 |
| 11,601,675 B2* | 3/2023 | Park | H04N 19/597 |
| 12,087,022 B2* | 9/2024 | Engelland-Gay | G06T 3/40 |
| 12,301,890 B2* | 5/2025 | Ray | H04N 19/107 |
| 2022/0321913 A1* | 10/2022 | Ramasubramonian | G06T 9/001 |
| 2024/0314358 A1* | 9/2024 | Ramasubramonian | H04N 19/186 |
| 2024/0394927 A1* | 11/2024 | Engelland-Gay | G06T 3/40 |
| 2025/0086845 A1* | 3/2025 | Lasserre | H04N 19/96 |
| 2025/0166233 A1* | 5/2025 | Ramasubramonian | H04N 19/96 |

(Continued)

OTHER PUBLICATIONS

European Patent Application No. 21305459.6 Search Report dated Sep. 3, 2021, 10 pages.

(Continued)

*Primary Examiner* — Anand P Bhatnagar
(74) *Attorney, Agent, or Firm* — Cozen O'Connor

(57) ABSTRACT

A method of encoding/decoding a point cloud into/from a bitstream of encoded point cloud data representing a physical object includes determining a dynamic list of at least one prediction data used to derive at least one candidate predictor used to encode geometry data of points of the point cloud. The list of at least one prediction data is dynamic because during the encoding of points, prediction data are updated based on residuals radius of decoded points.

20 Claims, 6 Drawing Sheets

(56) References Cited

U.S. PATENT DOCUMENTS

2025/0211753 A1* 6/2025 Gudumasu ......... H04N 21/8543
2025/0252611 A1* 8/2025 Taquet .................... G06T 9/001

OTHER PUBLICATIONS

WG 7 et al., "Description of Exploration Experiment 13.2 on inter prediction", ISO/IEC JTC 1SC 29/WG 7, N0063, Jan. 2021, 8 pages.

Ahn et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, 14 pages.

* cited by examiner

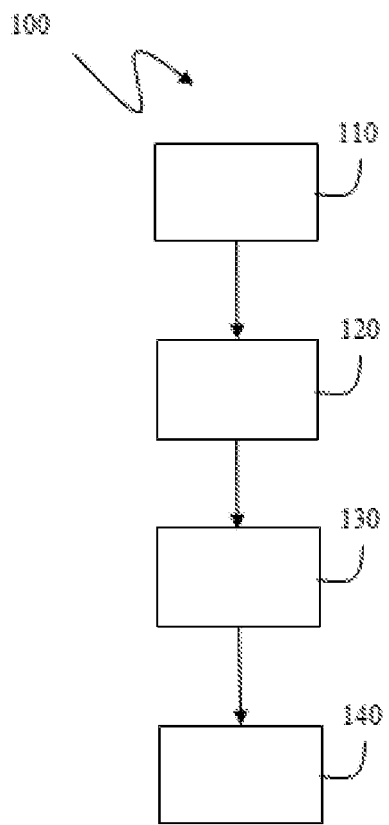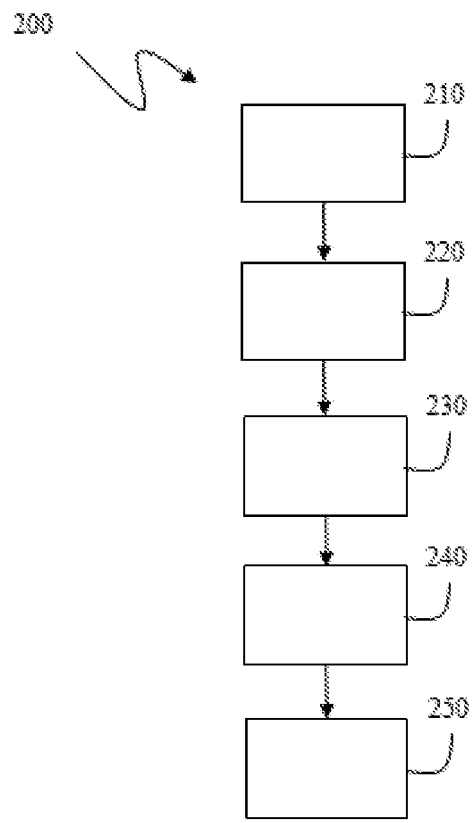
Fig. 7  Fig. 8
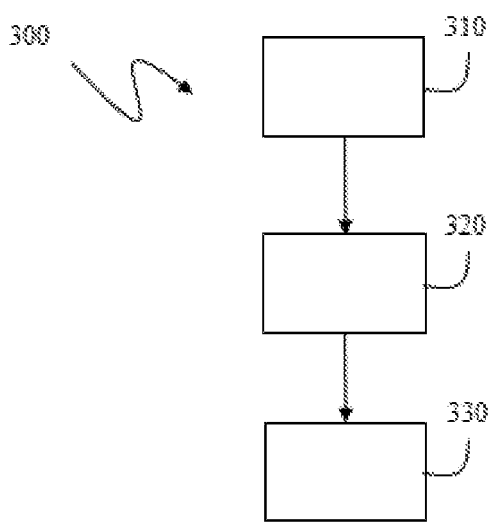
Fig. 9

METHOD AND APPARATUS OF ENCODING/DECODING POINT CLOUD GEOMETRY DATA CAPTURED BY A SPINNING SENSORS HEAD

CROSS-REFERENCE TO RELATED APPLICATIONS

This application is a U.S. National Stage Application of International Application No. PCT/CN2021/123662, filed Oct. 13, 2021, which claims priority to European Patent Application No. EP21305459.6 filed on Apr. 9, 2021, the content of which is hereby incorporated by reference in its entirety into this disclosure.

FIELD

The present application generally relates to point cloud compression and, in particular to methods and apparatus of encoding/decoding point cloud geometry data captured by a spinning sensor head.

BACKGROUND

The present section is intended to introduce the reader to various aspects of art, which may be related to various aspects of at least one embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored, and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR), and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, and may include additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y, and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y, or z, and may include more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensor head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensor head have been already exploited to get very efficient encoding/decoding methods.

For example, G-PCC exploits the elevation angle (relative to the horizontal ground) of capture from a spinning sensor head as depicted on FIGS. 1 and 2. A spinning sensor head 10 comprises a set of sensors 11 (for example lasers), here five sensors are represented. The spinning sensor head 10 may spin around a vertical axis z to capture geometry data of a physical object, i.e. the 3D locations of points of the point cloud. The geometry data captured by the spinning sensor head is then represented in spherical coordinates ($r_{3D}$, $\phi$, $\theta$), where $r_{3D}$ is the distance of a point P from the spinning sensor head's center, $\phi$ is an azimuthal angle of the sensor head's spin relative to a referential, and $\theta$ is an elevation angle for an elevation angle index k of a sensor of the spinning sensor head relative to a horizontal referential plane (here the y axis). The elevation angle index k may be, for instance, an elevation angle of a sensor k, or a k-th sensor position, in case a single sensor is successively probing for the each one of the successive elevation angles.

A regular distribution along the azimuthal angle has been observed on geometry data captured by a spinning sensor head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i, \forall i=0$ to I−1 where I is a number of azimuthal angles used for the capture of the points and $\theta_k, \forall k=0$ to K−1 where K is a number of sensors of the spinning sensor head 10. Basically, G-PCC represents sparse geometry data captured by a spinning sensor head on a 2D discrete angular plane ($\phi$, $\theta$) as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into coordinates ($\phi$, $\theta$) and from the location of these coordinates relative to discrete coordinates ($\phi_i$, $\theta_k$) obtained from already coded points.

The predictive tree directly codes a first version of location of a current point P in the spherical coordinates (r, $\phi$, $\theta$), where r is the projected radius on the horizontal xy plane as depicted on FIG. 4 by $r_{2D}$, using the quasi 1D nature (r, $\phi_i$, $\theta_k$) of this coordinate space. Then, spherical coordinates (r, $\phi$, $\theta$) are converted into 3D cartesian coordinates (x,y,z) and a xyz residual is coded to tackle the errors of coordinate conversion, the approximation of elevation and azimuthal angles and potential noise.

FIG. 5 illustrates a point cloud encoder that is similar to G-PCC predictive tree based encoder.

First, cartesian coordinates (x,y,z) of points of the point cloud are transformed into spherical coordinates (r, $\phi$, $\theta$) by (r, $\phi$, $\theta$)=C2A(x,y,z).

The transformation function C2A(·) is partly given by:

$$r = \text{round}(\text{sqrt}(x^*x + y^*y)/\Delta Ir)$$

$$\phi = \text{round}(\text{atan } 2(y,x)/\Delta I\phi)$$

where round( ) is the rounding operation to the nearest integer value, sqrt( ) is the square root function and atan 2(y,x) is the arc tangent applied to y/x.

$\Delta Ir$ and $\Delta I\phi$ are internal precisions for radiuses and azimuthal angles respectively. They are typically the same as their respective quantization steps, i.e. $\Delta I\phi = \Delta\phi$, and $\Delta Ir = \Delta r$ with $$\Delta\phi = \frac{2*\pi}{2^N},$$

and, $$\Delta r = 2^M * \text{elementary quantization step}$$

where M and N are two parameters of the encoder that may be signaled in a bitstream in a geometry parameter set, and where elementary quantization step is typically equal to 1. Typically, N may be 17, and M may be 0 for lossless coding.

The encoder may derive $\Delta\phi$ and $\Delta r$ by minimizing the cost (e.g. the number of bits) for coding the spherical coordinates representation and the xyz residual in cartesian space.

For sake of simplicity, $\Delta\phi = \Delta I\phi$ and $\Delta r = \Delta Ir$ hereafter.

Also for sake of clarity and simplicity, θ is used hereafter as an elevation angle value, that is obtained, for instance using $$\theta = a\tan\left(\frac{z}{r}\right),$$

where atan(·) is an arc tangent function. But, in G-PCC for instance θ is an integer value representing the elevation angle index k of $\theta_k$ (i.e. the index of the k-th elevation angle), and so operations presented hereafter (prediction, residual (de)coding, etc. . . . ) performed on θ would be applied on the elevation angle index instead. Someone skilled in point cloud compression would easily understand the advantage of using index k, and how to use elevation angle index k instead of θ. Also, someone skilled in point cloud compression would easily understand that this subtility does not affect the principle of the proposed invention.

Residual spherical coordinates $(r_{res}, \phi_{res}, \theta_{res})$ between spherical coordinates $(r, \phi, \theta)$ and predicted spherical coordinates obtained from a predictor $PR_n$ are then given by:

$$(r_{res},\phi_{res},\theta_{res})=(r,\phi,\theta)-(r_{pred},\phi_{pred},\theta_{pred})=(r,\phi,\theta)-PR_n-(0,m^*\phi_{step},0) \quad (1)$$

where $PR_n$ is a predictor selected from a list of candidate predictors $PR_0$, $PR_1$, $PR_2$ and $PR_3$ and m is an integer number of elementary azimuthal steps $\phi_{step}$ to be added to a prediction of the azimuthal angle.

The elementary azimuthal step $\phi_{step}$ may be derived by the encoder from the frequencies and rotation speed at which a spinning sensors head is performing capture at the different elevation angles, for example from NP the number of probing per head turn:

$$\phi_{step} = \frac{2*\pi}{NP*\Delta\phi},$$

and signaled in a bitstream in a geometry parameter set. Alternatively NP is a parameters of the encoder that may be signaled in a bitstream in a geometry parameter set, and $\phi_{step}$ is similarly derived in both encoder and decoder.

The residual spherical coordinates $(r_{res}, \phi_{res}, \theta_{res})$ may be encoded in a bitstream B.

The residual spherical coordinates $(r_{res}, \phi_{res}, \theta_{res})$ may be quantized (Q) in quantized residual spherical coordinates $Q(r_{res}, \phi_{res}, \theta_{res})$. Quantized residual spherical coordinates $Q(r_{res}, \phi_{res}, \theta_{res})$ may be encoded in a bitstream B.

The prediction index n and the number m are signalled in the bitstream B for each node of the predictive tree, while the elementary azimuthal step $\phi_{step}$ with some fixed-point precision is shared by all nodes of a same predictive tree.

The prediction index n points to a selected predictor among a list of candidate predictors.

A candidate predictor $PR_0$ may equal to $(r_{min}, \phi_0, \theta_0)$, where $r_{min}$ is the minimum radius value (provided in the geometry parameter set), and $\phi_0$ and $\theta_0$ are equal to 0 when a current node (current point P) has no parent or are equal to azimuthal and elevation angles of the point associated with the parent node.

Another candidate predictor $PR_1$ may equal to $(r_0, \phi_0, \theta_0)$, where $r_0, \phi_0$ and $\theta_0$ are respectively the radius, azimuthal and elevation angle of the point associated with the parent node of a current node.

Another candidate predictor $PR_2$ may equal to a linear prediction of the radius, azimuthal and elevation angles using the radius, azimuthal and elevation angles $(r_0, \phi_0, \theta_0)$, of the point associated with the parent node of a current node, and the radius, azimuthal and elevation angle $(r_1, \phi_1, \theta_1)$ of the point associated with the grand-parent node.

For example, $PR_2=2*(r_0, \phi_0, \theta_0)-(r_1, \phi_1, \theta_1)$

Another candidate predictor $PR_3$ may equal to a linear prediction of the radius, azimuthal and elevation angles using the radius, azimuthal and elevation angles $(r_0, \phi_0, \theta_0)$ of the point associated with the parent node of a current node, the radius, azimuthal and elevation angles $(r_1, \phi_1, \theta_1)$ of the point associated with the grand-parent node and the radius and the azimuthal and elevation angles $(r_2, \phi_2, \theta_2)$ of the point associated with the great grand-parent.

For example, $PR_3=(r_0, \phi_0, \theta_0)+(r_1, \phi_1, \theta_1)-(r_2, \phi_2, \theta_2)$ Predicted cartesian coordinates $(x_{pred}, y_{pred}, z_{pred})$ are obtained by inverse transforming decoded spherical coordinates $(r_{dec}, \phi_{dec}, \theta_{dec})$ by:

$$(x_{pred},y_{pred},z_{pred})=A2C(r_{dec},\phi_{dec},\theta_{dec}) \quad (2)$$

where decoded spherical coordinates $(r_{dec}, \phi_{dec}, \theta_{dec})$, as by a decoder, may be given by:

$$(r_{dec},\phi_{dec},\theta_{dec})=(r_{res,dec},\phi_{res,dec},\theta_{res,dec})+Pr_n+(0,m^*\phi_{step},0), \quad (3)$$

where $(r_{res,dec}, \phi_{res,dec}, \theta_{res,dec})$ are decoded residual spherical coordinates, as by a decoder. The decoded residual spherical coordinates $(r_{res,dec}, \phi_{res,dec}, \theta_{res,dec})$ may be the result of the inverse quantization (IQ) of quantized residual spherical coordinates $Q(r_{res}, \phi_{res}, \theta_{res})$.

In G-PCC, there is no quantization of residual spherical coordinates, and the decoded spherical coordinates $(r_{res,dec}, \phi_{res,dec}, \theta_{res,dec})$ equal the residual spherical coordinates $(r_{res}, \phi_{res}, \theta_{res})$. The decoded spherical coordinates $(r_{dec}, \phi_{dec}, \theta_{dec})$ are then equal to the spherical coordinates $(r, \phi, \theta)$.

Inverse transforming decoded spherical coordinates $(r_{dec}, \phi_{dec}, \theta_{dec})$ may be given by:

$$r=r_{dec}*\Delta r$$

$$x_{pred}=\text{round}(r*\cos(\phi_{dec}*\Delta\phi))$$

$$y_{pred}=\text{round}(r*\sin(\phi_{dec}*\Delta\phi)$$

$$z_{pred}=\text{round}(\tan(\phi_{dec})*r)$$

where sin( ) and cos( ) are sine and cosine functions. These two functions may be approximated by operations working on fixed-point precision. The values $\tan(\theta_{dec})$ may be also stored as fixed-point precision values. Consequently, no floating-point operation is used in the decoder. Avoiding floating point operations is usually a strong requirement to ease the hardware implementations of codecs.

Residual cartesian coordinates $(x_{res}, y_{res}, z_{res})$ between the original points and predicted cartesian coordinates $(x_{pred}, y_{pred}, z_{pred})$ are given by:

$$(x_{res},y_{res},z_{res})=(x,y,z)-(x_{pred},y_{pred},z_{pred})$$

Residual cartesian coordinates $(x_{res}, y_{res}, z_{res})$ are quantized (Q) and quantized residual cartesian coordinates $Q(x_{res}, y_{res}, z_{res})$ are encoded into the bitstream.

Residual cartesian coordinates may be lossless coded when x,y,z quantization steps are equal to the original point precision (typically 1), or lossy coded when quantization steps are larger than the original point precision (typically quantization steps larger than 1).

Decoded cartesian coordinates $(x_{dec}, y_{dec}, z_{dec})$, as by a decoder, are given by:

$$(x_{dec},y_{dec},z_{dec})=(x_{pred},y_{pred},z_{pred})+IQ(Q(x_{res},y_{res},z_{res})) \quad (4)$$

where $IQ(Q(x_{res}, y_{res}, z_{res}))$ represents inverse-quantized quantized residual cartesian coordinates.

Those decoded cartesian coordinates $(x_{dec}, y_{dec}, z_{dec})$ may be used by the encoder for example for ordering (decoded) points before attribute coding.

FIG. 6 illustrates a point cloud decoder that is similar to G-PCC predictive tree based decoder for the predictive tree.

A prediction index n and a number m are accessed from the bitstream B for each node of the predictive tree, while the elementary azimuthal step $\phi_{step}$ is accessed from a parameter set of the bitstream B and is shared by all nodes of a same predictive tree.

Decoded residual spherical coordinates $(r_{res,dec}, \phi_{res,dec}, \theta_{res,dec})$ may be obtained by decoding residual spherical coordinates $(r_{res}, \phi_{res}, \theta_{res})$ from the bitstream B.

Quantized residual spherical coordinates $Q(r_{res}, \phi_{res}, \theta_{res})$ may be decoded from the bitstream B. The quantized residual spherical coordinates $Q(r_{res}, \phi_{res}, \theta_{res})$ are inverse quantized to obtain decoded residual spherical coordinates $(r_{res,dec}, \phi_{res,dec}, \theta_{res,dec})$.

Decoded spherical coordinates $(r_{dec}, \phi_{dec}, \theta_{dec})$ are obtained by adding decoded residual spherical coordinates $(r_{res,dec}, \phi_{res,dec}, \theta_{res,dec})$ and predicted spherical coordinates $(r_{pred}, \phi_{pred}, \theta_{pred})$ according to equation (3).

Predicted cartesian coordinates $(x_{pred}, y_{pred}, z_{pred})$ are obtained by inverse transforming decoded spherical coordinates $(r_{dec}, \phi_{dec}, \theta_{dec})$ according to equation (2).

Quantized residual cartesian coordinates $Q(x_{res}, y_{res}, z_{res})$ are decoded from the bitstream B and inverse quantized to obtain inverse quantized cartesian coordinates $IQ(Q(x_{res}, y_{res}, z_{res}))$. The decoded cartesian coordinates $(x_{dec}, y_{dec}, z_{dec})$ are given by equation (4).

For fast processing of point cloud data captured by spinning sensor head, data shall be processed according to their acquisition order, without taking additional time to reorder the points for more efficient compression.

For instance, one slice or one predictive tree may be derived per sensor index or alternatively a degenerated tree may be built as a comb tree wherein each comb tooth is associated with a sensor index and contains a chain of the points for this sensor index in their order of acquisition.

In the presence of noise, the candidate predictors $PR_2$ and $PR_3$ are generally not efficient. Therefore, they are rarely selected because point cloud data captured by spinning sensor head are usually noisy due to the very nature of the acquisition process.

Candidate predictor $PR_1$ (aka Delta predictor) is very often selected as it is less sensitive to noise. However, sensors generally capture object at various distance from the sensor and huge jumps in radius between two successive points may be observed, leading to high-magnitude residual radial values to be encoded in the bitstream. Neither candidate predictor $PR_1$ nor $PR_2$ or $PR_3$ are suited for the prediction of these jumps. Candidate predictor $PR_0$ may sometimes be useful when the object is close to the sensor (i.e. close to the minimum radius), but for objects far from the sensor, the candidate predictor $PR_0$ is also inefficient. Moreover, a disadvantage of the candidate predictor $PR_0$ is the introduction of a latency of one frame in the processing of the point cloud data in order to get the suited minimum radius. For real time processing, a suboptimal value, like 0 for instance, would be used.

In order to improve the prediction and so the compression of point cloud geometry data captured by spinning sensor head, a better prediction scheme is needed, especially for predicting radial information, which takes the most important part of the bit budget in the bitstream.

SUMMARY

The following section presents a simplified summary of at least one embodiment in order to provide a basic understanding of some aspects of the present application. This summary is not an extensive overview of an embodiment. It is not intended to identify key or critical elements of an embodiment. The following summary merely presents some aspects of at least one of the embodiments in a simplified form as a prelude to the more detailed description provided elsewhere in the document.

According to a first aspect of the present application, there is provided a method of encoding a point cloud into a bitstream of encoded point cloud data representing a physical object, each point of the point cloud being associated with at least a radius responsive to a distance of the point from a referential, the method comprising selecting a predictor of at least a predicted radius data representative of a radius of a point of the point cloud from at least one predictor derived from at least one prediction data; encoding, in the bitstream, a data representative of a prediction data from which the selected predictor is derived; encoding, in the bitstream, residual radius data between a data representative of the radius of the point and a predicted radius data derived from the selected predictor; and updating said at least one prediction data based on the residual radius data.

According to a second aspect of the present application, there is provided a method of decoding a point cloud from a bitstream of encoded point cloud data representing a physical object, each point of the point cloud being associated with at least a radius responsive to a distance of the point from a referential, the method comprising decoding, from the bitstream, a data representative of a prediction data of a list of at least one prediction data from which a predictor of at least a predicted radius data representative of a radius of a point of the point cloud is derived; deriving a predicted radius data of the point from the predictor; decoding, from the bitstream, a residual radius of the point; deriving a data representative of the radius of the point from the residual radius data and the predicted radius data; and updating (250) said at least one prediction data based on the residual radius data.

According to a third aspect of the present application, there is provided an apparatus of encoding a point cloud into a bitstream of encoded point cloud data representing a physical object. The apparatus comprising one or more processors configured to carry out a method according to the first aspect of the present application.

According to a fourth aspect of the present application, there is provided an apparatus of decoding, from a bitstream, a point of a point cloud representing a physical object. The apparatus comprising one or more processors configured to carry out a method according to the second aspect of the present application.

According to a fifth aspect of the present application, there is provided a non-transitory storage medium carrying instructions of program code for executing a method according to the first aspect of the present application or a method according to the second aspect of the present application.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present application, and in which:

FIG. 7 illustrates a block diagram of steps of the method 100 of encoding a point cloud representing a physical object in accordance with at least one embodiment;

FIG. 8 illustrates a block diagram of steps of the method 200 of decoding a point cloud representing a physical object in accordance with at least one embodiment;

FIG. 9 illustrates a block diagram of steps of the method 300 of updating the list of at least one prediction data PDp from a residual radius data in accordance with at least one embodiment.

Similar reference numerals may have been used in different figures to denote similar components.

DESCRIPTION OF EMBODIMENTS

Figure 1:
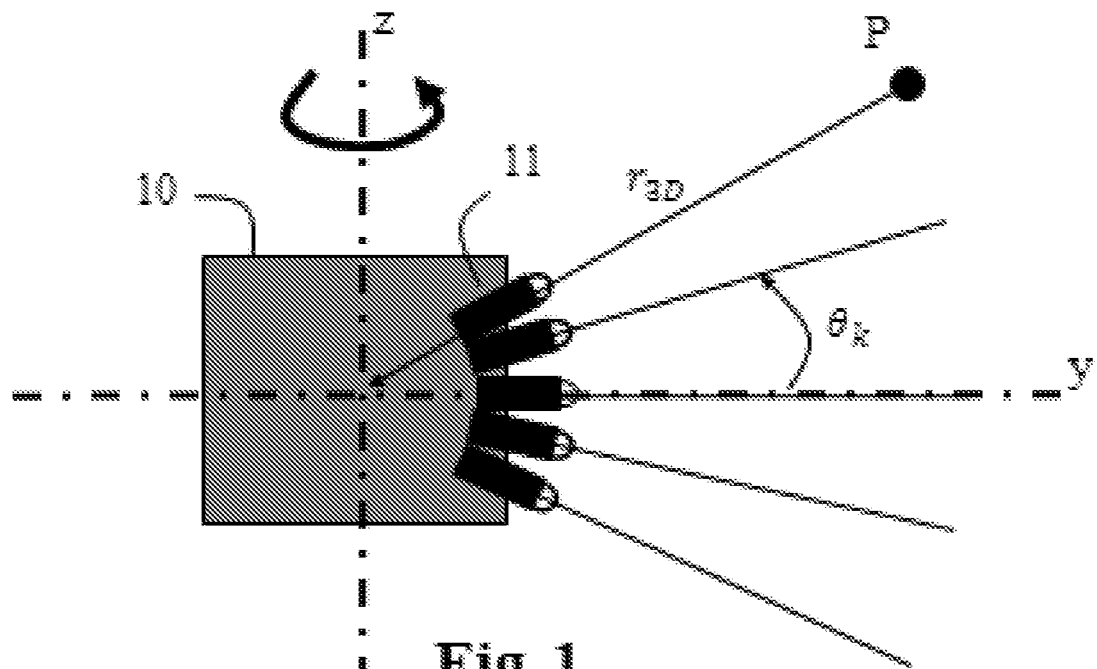
FIG. 1 illustrates a side view of a sensors head and some of its parameters in accordance with prior art.
Figure 2:
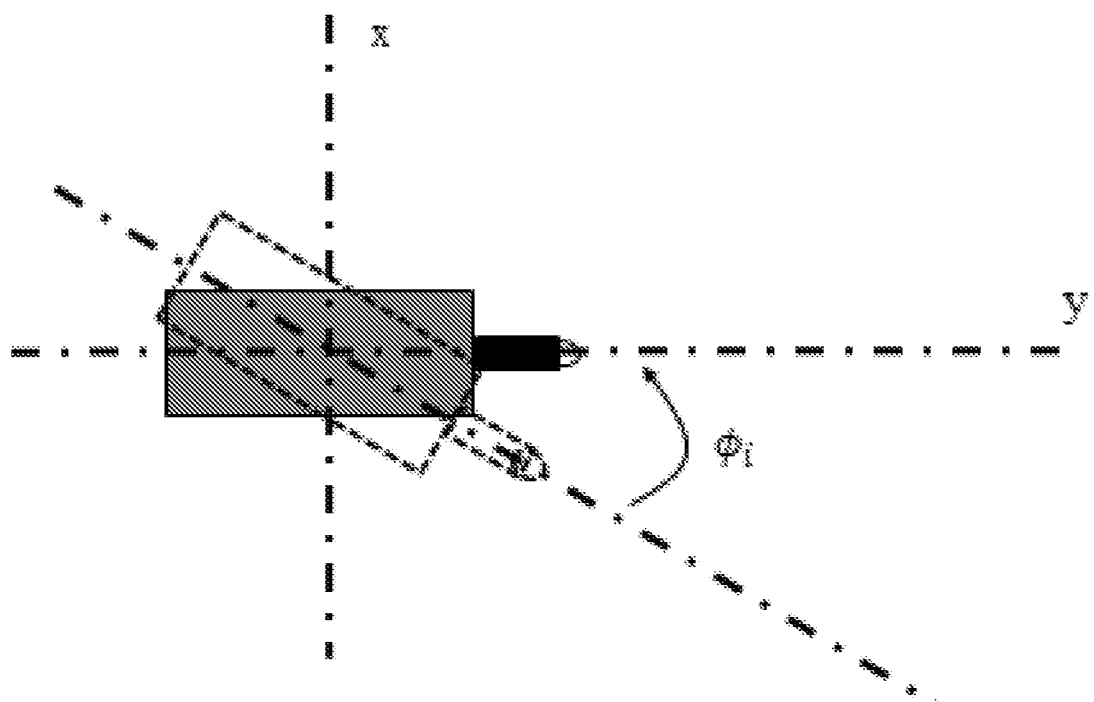
FIG. 2 illustrates a top view of the sensors head and some of its parameters in accordance with prior art.
Figure 3:
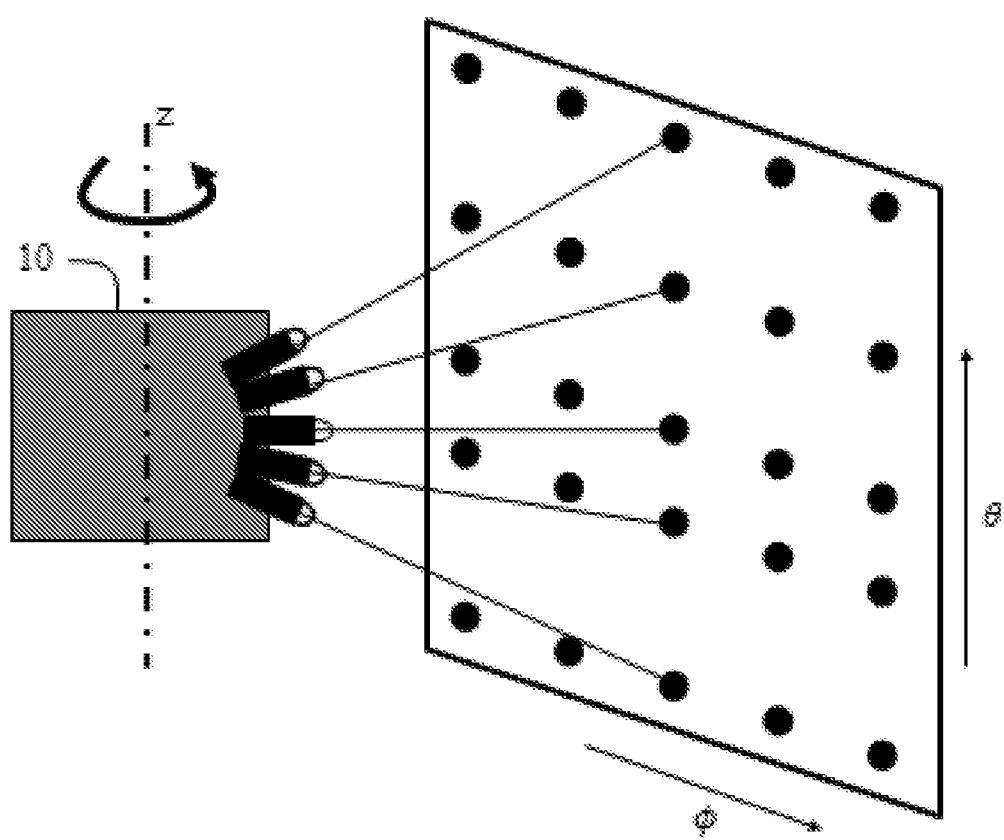
FIG. 3 illustrates a regular distribution of data captured by a spinning sensors head in accordance with prior art.
Figure 4:
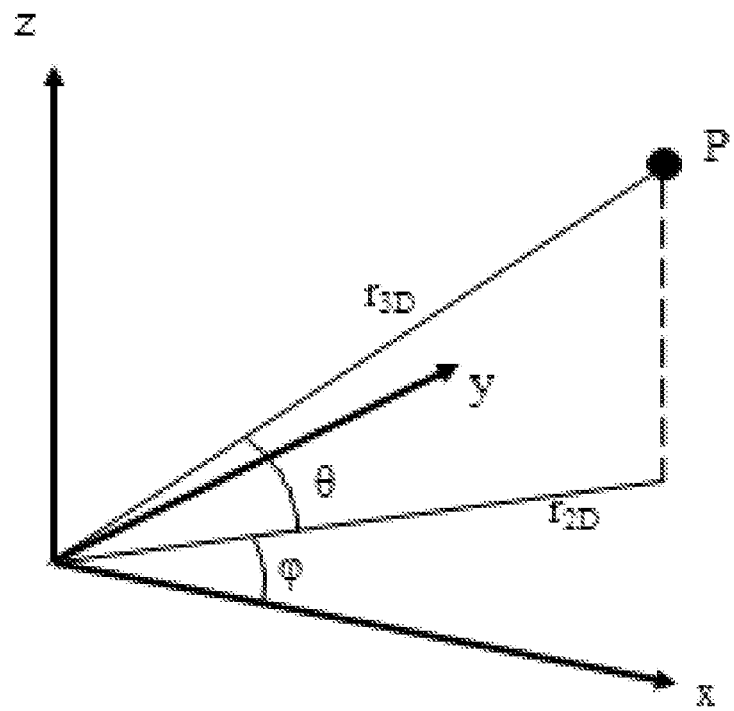
FIG. 4 illustrates a representation of a point in a 3D space in accordance with prior art.

At least one of the embodiments is described more fully hereinafter with reference to the accompanying figures, in which examples of at least one of the embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

At least one of the aspects generally relates to point cloud encoding and decoding, and at least one other aspect generally relates to transmitting a bitstream generated or encoded.

According to a first aspect of the present application, there is provided a method of encoding a point cloud into a bitstream of encoded point cloud data representing a physical object, each point of the point cloud being associated with at least a radius responsive to a distance of the point from a referential, the method comprising selecting a predictor of at least a predicted radius data representative of a radius of a point of the point cloud from at least one predictor derived from at least one prediction data; encoding, in the bitstream, a data representative of a prediction data from which the selected predictor is derived; encoding, in the bitstream, residual radius data between a data representative of the radius of the point and a predicted radius data derived from the selected predictor; and updating said at least one prediction data based on the residual radius data.

According to a second aspect of the present application, there is provided a method of decoding a point cloud from a bitstream of encoded point cloud data representing a physical object, each point of the point cloud being associated with at least a radius responsive to a distance of the point from a referential, the method comprising decoding, from the bitstream, a data representative of a prediction data of a list of at least one prediction data from which a predictor of at least a predicted radius data representative of a radius of a point of the point cloud is derived; deriving a predicted radius data of the point from the predictor; decoding, from the bitstream, a residual radius of the point; deriving a data representative of the radius of the point from the residual radius data and the predicted radius data; and updating (250) said at least one prediction data based on the residual radius data.

In one embodiment, updating at least one prediction data based on the residual radius data is based on a comparison of the residual radius data with a threshold.

In one embodiment, updating at least one prediction data based on the residual radius data comprises: when the residual radius data is greater than the threshold, a new prediction data derived from at least the residual radius data is added to the top of the list of prediction data; and when the residual radius data is lower than the threshold, the prediction data from which the selected predictor is derived, or the prediction data associated with the data representative of a prediction data of a list of at least one prediction data from which a predictor of at least a predicted radius data representative of a radius of a point of the point cloud, is updated based on at least the radius residual data, and the updated prediction data is moved to the top of the list of prediction data.

In one embodiment, when the residual radius data is greater than the threshold and when a maximum number of prediction data of the list of prediction data is reached, the last prediction data of the list of prediction data is removed from the list of prediction data.

In one embodiment, the predicted radius data of a prediction data is a radius of a decoded point of the point cloud and said prediction data further comprises an azimuthal angle of said decoded point, and a predictor comprising said predicted radius data and said azimuthal angle.

In a variant, the azimuthal angle of the predictor represents a sum of the azimuthal angle of said decoded point with an integer number of elementary azimuthal steps.

In one embodiment, the predicted radius data of a prediction data is a radius of a decoded point of the point cloud and said prediction data further comprises a quantized residual azimuthal angle associated with said decoded point, and a predictor comprising said predicted radius data and said quantized residual azimuthal angle.

In one embodiment, the predicted radius data of a prediction data is a quantized radius of a decoded point and said prediction data further comprises a quantized residual azimuthal angle associated with said decoded point, and a predictor comprising said predicted radius data and said quantized residual azimuthal angle In one embodiment, a list of spherical coordinate predictors is associated with each sensor of a spinning sensor head used for capturing the points of the point cloud.

According to a third aspect of the present application, there is provided a bitstream of encoded point cloud data representing a physical object, each point of the point cloud being associated with at least a radius responsive to a distance of the point from a referential, wherein the bitstream further comprises a data representative of a prediction data of a list of at least one prediction data from which a predictor of at least a radius of a point of the point cloud is derived.

According to a fourth aspect of the present application, there is provided an apparatus of encoding a point cloud into a bitstream of encoded point cloud data representing a physical object. The apparatus comprising one or more processors configured to carry out a method according to the first aspect of the present application.

According to a fifth aspect of the present application, there is provided an apparatus of decoding, from a bitstream, a point of a point cloud representing a physical object. The apparatus comprising one or more processors configured to carry out a method according to the second aspect of the present application.

According to a sixth aspect of the present application, there is provided a computer program product including instructions which, when the program is executed by one or more processors, causes the one or more processors to carry out a method according to the first aspect of the present application or a method according to the second aspect of the present application.

According to a seventh aspect of the present application, there is provided a non-transitory storage medium carrying instructions of program code for executing a method according to the first aspect of the present application or a method according to the second aspect of the present application. Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to a method of encoding/decoding a point cloud representing a physical object, each point of the point cloud being associated with spherical coordinates representing at least a radius responsive to a distance of the point from a referential.

The present invention relates to a field of encoding and decoding technology, aims to provide a technical solution of encoding/decoding point cloud data. Since the point cloud is a set of mass data, a large amount of memory may be consumed by storing the point cloud, also it is impossible to transmit the point cloud directly in the network layer without compressing the point cloud, so that it is required to compress the point cloud. Therefore, the present invention can be used in many application scenarios, as the point cloud is more and more widely used in autonomous navigation, real-time inspection, geographic information service, culture heritage/buildings protection, 3D immersion communication and interaction, and so on.

The present encoding/decoding method particularly relates to encoding/decoding the point cloud data based on the dynamic list of prediction data, to improve the compression performance of the point cloud, for example, the total bitrate to encode/decode the point cloud data can be improved.

The present invention determines a dynamic list of at least one prediction data used to derive at least one candidate predictor used to encode geometry data of points of the point cloud. The list of at least one prediction data is dynamic because during the encoding or decoding of points, prediction data are updated based on residual radius data representative of residual radius of decoded points.

Such a dynamic list of prediction data allows to keep track of various object distances and produces a more efficient prediction than a list of statically predetermined predictors as used in GPCC's predictive tree, leading to an improvement of the total bitrate to encode both data representative of selected predictors and the prediction residual.

A dynamic list of prediction data is particularly useful (but not only) for obtaining/deriving better prediction after a sensor (laser) beam has moved from a first object, with a first distance, to another object, with a different distance, has passed over it and is passing back to the first object. It may occur, for instance, when one object is in front of another one (like a car in front of a wall, for instance), or when an object has holes (walls with open doors or windows, or entrance wall for instance).

FIG. 7 illustrates a block diagram of steps of a method 100 of encoding a point cloud representing a physical object in accordance with at least one embodiment.

A list of prediction data comprises at least one prediction data $PD_p$. A prediction data $PD_p$ comprises a predicted radius data $R_p$ representative of a radius of a point of the point cloud, and a data $D_p$ representative of an azimuthal angle of said point.

Initially, i.e. at the beginning of the coding of a point cloud or of a G-PCC slice, for instance, the list of prediction data comprises a single prediction data $PD_0$. The single prediction data $PD_0$ comprises a data $R_0$ representative of an initial radius and a data $D_0$ representative of an initial azimuthal angle.

The single prediction data $PD_0$ may be a default predictor known beforehand by both the encoder and the decoder. For example, The single prediction data $PD_0$ may comprises an initial radius which may be a predetermined minimal radius value extracted from all the points of the point cloud and an initial azimuthal angle which may be the azimuthal angle of the root node of the predictive tree or a minimal value extracted from all the possible azimuthal angles of the spinning sensor head.

As explained below in details, new prediction data $PD_p$ may be added to the list of prediction in some conditions. Then, the list of prediction data comprises at least one prediction data $PD_p$ and a candidate predictor $DPR_p$ is obtained for each prediction data $PD_p$. The candidate predictors $DPR_p$ are thus obtained dynamically according to the update of the list of prediction data.

In one embodiment of the method, a list of prediction data is associated with each elevation angle index k of a sensor of the spinning sensor head and a list of candidate predictors $DPR_p$ is associated with each list of prediction data. Each list of prediction data is then updated independently to each other.

In one embodiment of the method, a list of candidate predictors comprises at least one candidate predictor $DPR_p$ of at least a predicted radius data representative of a radius of a point of the point cloud.

The list of candidate predictors $DPR_p$ can replace the predictors $PR_0$ to $PR_3$ predictors in G-PCC or at least one predictor $PR_0$, $PR_1$, $PR_2$ and/or $PR_3$ as defined in G-PCC can be in competition with the candidate predictor $DPR_p$.

In step 110, a predictor $DPR$ of at least a predicted radius data representative of a radius of a point of the point cloud is selected from the list of at least one candidate predictor $DPR_p$ derived from the list of at least one prediction data $PD_p$.

Selection may be done, for instance, by using a rate cost function- or a rate-distortion cost function—(in case of lossy coding) based optimization process that selects the candidate predictor DPR that minimizes said cost function.

In step 120, a data DA representative of the prediction data from which the selected predictor DPR is derived is encoded in a bitstream B.

In one embodiment of step 120, the data DA is an index of the prediction data PD of the list of prediction data from which the selected candidate predictor DPR is derived.

In step 130, a residual radius data between a data representative the radius of the point and a predicted radius data derived from the selected predictor, is encoded in the bitstream B.

In variant, the residual radius is quantized before being encoded.

In step 140, at least one prediction data $PD_p$ is updated based on the residual radius data and preferably, according to the method 300 of FIG. 9.

FIG. 8 illustrates a block diagram of steps of the method 200 of decoding a point cloud representing a physical object in accordance with at least one embodiment.

A list of prediction data comprises at least one prediction data $PD_p$. A prediction data $PD_p$ comprises a predicted radius data $R_p$ representative of a radius of a decoded point of the point cloud, and a data $D_p$ representative of an azimuthal angle of a decoded point.

Initially, e.g at the beginning of the decoding of a point cloud or of a G-PCC slice, for instance, the list of prediction data comprises a single prediction data $PD_0$ as explained in FIG. 7.

As explained below in details, new prediction data $PD_p$ may be added to the list of prediction in some conditions. Then, the list of prediction data comprises at least one prediction data $PD_p$ and a candidate predictor $DPR_p$ is obtained for each prediction data $PR_p$. The candidate predictors $DPR_p$ are thus obtained dynamically according to the update of the list of prediction data.

In on embodiment of the method, a list of prediction data is associated with each elevation angle index k of a sensor of the spinning sensor head and a list of candidate predictors $DPR_p$ is associated with each list of prediction data. Each list of prediction data is then updated independently to each other.

In one embodiment of the method, a list of candidate predictors comprises at least one candidate predictor $DPR_p$ of at least a radius of a point of the point cloud.

In step 210, a data DA is decoded from the bitstream B. The data DA is representative of a prediction data of a list of at least one prediction data $PD_p$ from which a predictor DPR of at least a predicted radius data representative of a radius of a point of the point cloud is derived. The predictor DPR belongs to the list of candidate predictors $DPR_p$.

In step 220, a predicted radius data of the point are derived from the predictor DPR.

In step 230, a residual radius data is decoded from the bitstream B.

In step 240, a data representative of the radius of the point is derived from the residual radius data and the predicted radius data.

In step 250, at least one prediction data $PD_p$ is updated based on the residual radius data and, preferably, according to the method 300 of FIG. 9.

FIG. 9 illustrates a block diagram of steps of the method 300 of updating the list of at least one prediction data $PD_p$ from a residual radius data in accordance with at least one embodiment.

Updating a list of at least one prediction data $PD_p$ takes as input a data DA representative of the selected candidate predictor DPR and a residual radius threshold Th-r.

In step 310, the residual radius data is compared to the residual radius threshold Th-r.

In one embodiment of the method 300, the residual radius threshold Th-r may be a fixed value, for instance it may be 1024, 2048 or 4096 scaled according to the bit-depth of the input data and/or to a quantization parameter.

In variant, the residual radius threshold Th-r may equal to a fixed value divided by a quantizing step when the comparison (further explained in details) is based on the quantized or inverse quantized residual radius.

In one embodiment of the method 300, the residual radius threshold Th-r may be a parameter that is signalled in/accessed from the bitstream B. It may belong to a geometry parameter set of the bitstream B for instance.

In one embodiment of the method 300, the residual radius threshold Th-r may be a dynamically computed threshold. For instance, it may be computed from the variance of the residual radius that can be estimated from (some of) preceding encoded/decoded residual radius, as an average of absolute values, for instance.

Because a radius represents a distance of a sensed object from a referential of the spinning sensor head, the updating of the list of prediction data based on the comparison of the residual radius data with a threshold, as described hereafter, keeps track of several distances, possibly corresponding to different objects in the sensed scene.

When the residual radius data is greater or equal to the residual radius threshold Th-r, then in step 320, a new prediction data $PD_p$ is added at the top (i.e. inserted as a new first element) of the list of prediction data. This new prediction data $PD_p$ is derived from at least the residual radius data.

A residual radius exceeding a threshold indicates the associated point could be part, for example, of a new object in front of another one (like a car in front of a wall, for instance), or behind of another one when an object has holes (walls with open doors or windows, or entrance wall for instance). Adding a new prediction data $PD_p$ to the list of prediction data leads to derive dynamically a new candidate predictor which provides better prediction for encoding other points on this new object than prediction derived from a predictor derived from the list of prediction data before update. But, above all, keeping in the list of prediction data prediction data obtained from points belonging to a previous object allows to "remember" (distance with) the previously seen object and so to derive candidate predictor which provides better prediction for encoding new points that would belong again to this previous object (when the spinning sensor will have crossed the new object for instance), and so, points that would have similar distance.

In variant, when the residual radius data is greater than the residual radius threshold Th-r and when a maximum number of prediction data of the list of prediction data is reached, the last prediction data of the list of prediction data is removed from the list of prediction data.

This will have a similar effect as forgetting the prediction data for (and distance with) the oldest seen object.

This variant limits the size in memory of the list of prediction data and the encoding cost of the data DA.

Typically, the list of prediction data is limited to 4, 5, 6, 7 or 8 elements. For such small list sizes, it is often more efficient to implement the list as a buffer/table/array of contiguous memory that is maintained so that the elements are ordered in memory according to their index in the list of prediction data. Then, this memory can stay in the cache memory of a typical processing unit, and, moving or inserting a predictor in the buffer/table/array, involves quick operations for moving a small portion of memory in the cache; and accessing in the cache to the prediction data $PD_p$ of an element of the list, to obtain a predictor $DPR_p$, is fast.

When residual radius data is lower than the residual radius threshold Th-r, then in step 330, the prediction data PD from which the selected predictor DPR is derived (step 110) or the prediction data PD associated with the data DA representative of a predictor DPR (step 210), is updated based on at least the residual radius data and the updated prediction data PD is moved to the top of the list of prediction data (i.e. it is moved before the first element of the list, and so it becomes the first element of the list).

A residual radius data lowering a threshold indicates the associated point of the point cloud be part of the same object as the one from which was obtained the prediction data PD. Thus, because those two points are part of a same object, the prediction data PD is updated according to the residual radius data. Moving the updated prediction data PD to the top of the list of prediction data is a simple way of allowing better compression performances for the coding of the data DA of the selected predictor because the predictor obtained/derived from that element has just been used, and there is much more chance that it is used again for next points. This also has the advantage of not "forgetting" most recently used prediction data (and so, prediction data that would have more chance to be used again later) when the last prediction data is removed from the list.

Figure 5:
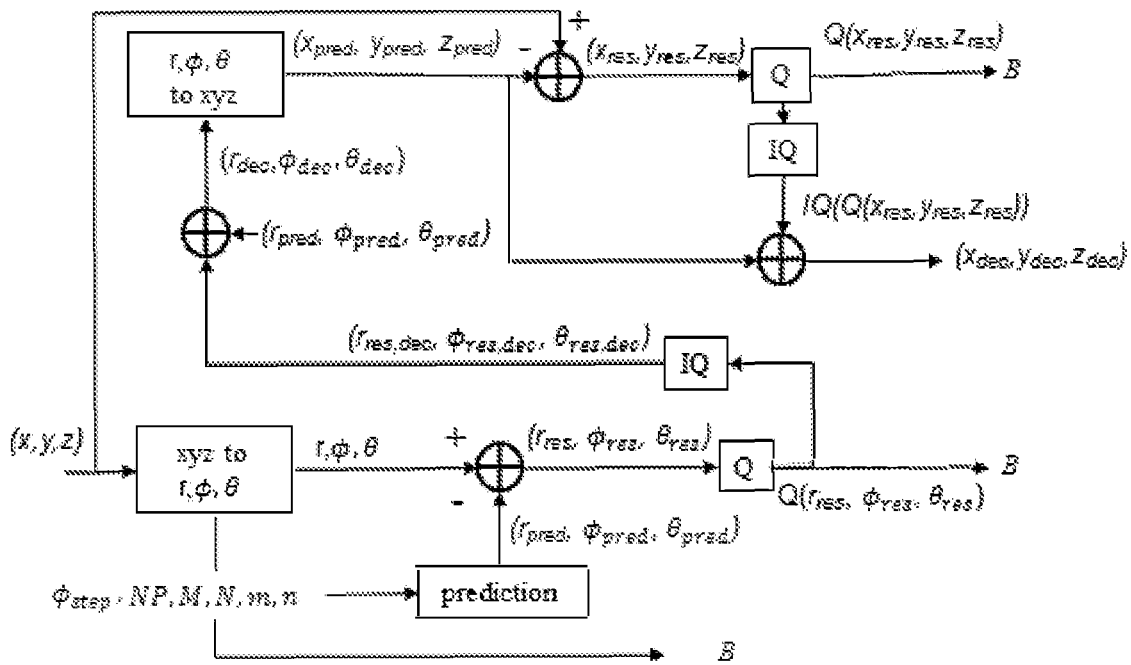
FIG. 5 illustrates a point cloud encoder that is similar to G-PCC predictive tree based encoder in accordance with prior art.
Figure 6:
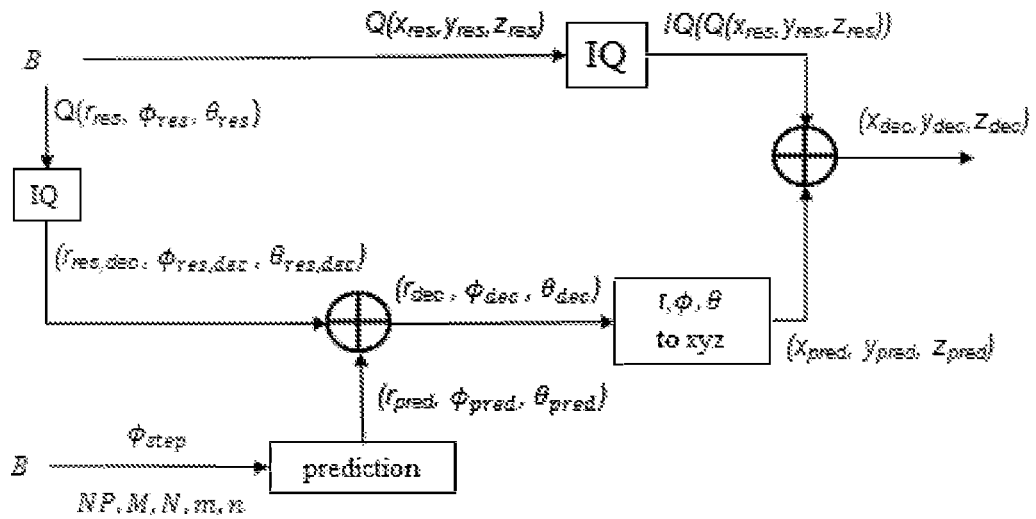
FIG. 6 illustrates a point cloud decoder that is similar to G-PCC predictive tree based decoder in accordance with prior art.

In one embodiment, the present invention may be used to improve the current G-PCC prediction scheme given by equation (1), (2) or (3) in which the radius r and the azimuthal angles $\phi$ are adaptatively quantized as described in the european patent application No. EP20306674. In that embodiment, $Q(r_{res}, \phi_{res}, \theta_{res})$, described in relation with FIGS. 5 and 6, is set equal to $(Qr_{res}, Q\phi_{res}, \theta_{res})$, where $Qr_{res}$ and $Q\phi_{res}$ are an adaptively quantized radius residual and an adaptively quantized azimuthal angle residual, as described hereafter, and $\theta_{res}$ is a non quantized elevation angle (index) residual.

At the encoding side, a residual radius $r_{res}$ obtained from equation (1) is adaptively quantized by:

$$Qr_{res}=Q_r(r_{res},\phi_{pred})=\text{round}(r_{res}/\Delta r(\phi_{pred})) \quad (5)$$

where $Q_r$ is an adaptive quantizer using a quantization step $\Delta r(\phi_{pred})$ given by:

$$\Delta r(\phi_{pred})=\Delta/(|\sin(\phi_{pred})|+|\cos(\phi_{pred})|) \quad (6)$$

where $\phi_{pred}$ is a predicted azimuthal angle of the azimuthal angle $\phi$ given by equation (1).

An inverse quantized residual radius $IQr_{res}$ is obtained by inverse quantizing $Qr_{res}$ by:

$$IQr_{res}=IQ_r(Qr_{res},\phi_{pred})=Qr_{res}*\Delta r(\phi_{pred})) \quad (7)$$

where $IQ_r$ is an adaptive inverse quantizer based on the predicted azimuthal angle $\phi_{pred}$.

A decoded radius $r_{dec}$ is obtained by adding the inverse quantized residual error radius $IQr_{res}$ to the predicted radius $r_{pred}$ given by equation (1).

A residual azimuthal angle $\phi_{res}$ obtained by equation (1) is adaptively quantized by:

$$Q\phi_{res}=Q_\phi(\phi_{res},r_{dec})=\text{round}(\phi_{res}/\Delta\phi(r_{dec})) \quad (8)$$

where $Q_\phi$ is an adaptive quantizer using a quantization step $\Delta\phi(r_{dec})$ given by:

$$\Delta\phi(r_{dec})=\Delta r(\phi_{pred})/r_{dec}$$

An inverse quantized residual azimuthal angle $IQ\phi_{res}$ is obtained by inverse quantizing $Q\phi_{res}$ by:

$$IQ\phi_{res}=IQ_\phi(Q\phi_{res},r_{dec})=Q\phi_{res}*\Delta\phi(r_{dec}) \quad (9)$$

where $IQ_\phi$ is an adaptive inverse quantizer based on the decoded radius $r_{dec}$.

Finally, decoded spherical coordinates $(r_{dec}, \phi_{dec}, \theta_{dec})$ of a decoded point, as by a decoder, may be given by:

$$(r_{dec},\phi_{dec},\theta_{dec})=(IQr_{res},IQ\phi_{res},\theta_{res})+Pr_n+(0,m*\phi_{step},0) \quad (10)$$

The quantized residual radius $Qr_{res}$ and the quantized residual azimuthal angle $Q\phi_{res}$ are encoded in the bitstream B.

In said embodiment of the present invention, the predicted radius data $R_p$ is the radius $r_{dec}$ of a decoded point, the data $D_p$ is the azimuthal angle $\phi_{dec}$ of said decoded point, and the residual data is a decoded residual radius associated with a current point of the point cloud.

In step 110 and 220, a predictor $PR_n$ in equation (1) or (3) may be a predictor belonging to the list of candidate predictor $DPR_p$ derived from the list of prediction data. A candidate predictor $DPR_p$ is given by:

$$DPR_p=(r_{dec,p},\phi_{dec,p},\theta_0) \quad (11)$$

where $\theta_0$ equals either to 0 when the node associated with the point has no parent, either to the elevation angles of the point associated with the parent node or to a predetermined minimum elevation angle, and where $r_{dec,p}$ and $\phi_{dec,p}$ are a (previously) decoded radius and a (previously) decoded azimuthal angle represented by predicted radius data $R_p$ and data $D_p$ respectively, and comprised in the prediction data $PD_p$.

This embodiment leads to very good prediction of the azimuthal angles of points having a similar (or higher) radius, especially when points have close azimuthal angles and when the quantization of the residual azimuthal angle depends on the radius.

In steps 140 and 250, the list of prediction data is updated based on a decoded residual radius $r_{res,dec}$ (residual radius data) obtained from decoded residual spherical coordinates $(r_{res,dec}, \phi_{res,dec}, \theta_{res,dec})$ associated with the decoded current point given by equation (3). Said decoded residual radius $r_{res,dec}$ may also be decoded from the bitstream B.

In step 320, the new prediction data $PD_p$ comprises the radius $r_{dec}$ (as being the predicted radius data $R_p$) and the azimuthal angle $\phi_{dec}$ (as being the data $D_p$) of the decoded current point given by equation (3). Thus, the new prediction data $PD_p$ enables to build a new candidate predictor $DPR_p$ from $r_{dec,p}$ and $\phi_{dec,p}$ which are set equal to the radius and azimuthal angle that have just been decoded: $r_{dec}$ and $\phi_{dec}$.

In step 330, the prediction data $PD_p$ is updated to comprise the data $R_p$ as being the radius $r_{dec}$ and the data $D_p$ as being the azimuthal angle $\phi_{dec}$ of the decoded current point. Thus, updated the prediction data $PD_p$ enables to build a candidate predictor $DPR_p$ from $r_{dec,p}$ and $\phi_{dec,p}$ updated to be equal to the radius and azimuthal angle that have just been decoded: $r_{dec}$ and $\phi_{dec}$.

In a variant of said embodiment, the radius is not adaptively quantized (and so, is (de)coded as in the G-PCC predictive tree based codec), and the quantization step of azimuthal angle $\Delta\phi(r_{dec})$ is defined by:

$$\Delta\phi(r_{dec})=\Delta\phi_{arc}/r_{dec},$$

where $\Delta\phi_{arc}$ represents a quantization step of an azimuthal arc length (i.e. the quantization step of an azimuthal angle multiplied by a radius). $\Delta\phi_{arc}$ may be chosen to be equal to 1, or $2^{1/2}$, or $8/2*\pi$ for instance. In the later case, when the internal precision for representing an azimuthal angle $\Delta I\phi$ is $(2*\pi)/2^N$, for instance, internal representation of $\Delta\phi_{arc}$ would be $\Delta I\phi_{arc}=\Delta I\phi*\Delta\phi_{arc}=\frac{1}{2}^{N-3}$ thus multiplication or division by $\Delta\phi_{arc}$ can be implemented by using a simple bitwise shift operation.

In another variant of said embodiment, the azimuthal angle of a candidate predictor $DPR_p$ represents the sum of a (previously) decoded azimuthal angle $\phi_{dec,p}$ (a predicted azimuthal angle) with an integer number $m_p$ of elementary azimuthal steps $\phi_{step}$ separating said decoded azimuthal angle and the azimuthal angle $\phi_0$ of the point associated with the parent node of the current point.

In step 110 and 220, a predictor $PR_n$ in equation (1) or (3) may be a candidate predictor belonging to the list of candidate predictor $DPR_p$ derived from the list of prediction data. A candidate predictor $DPR_p$ is then given by:

$$DPR_p=(r_{dec,p},\phi_{dec,p}+m_p*\phi_{step},\theta_0) \quad (12)$$

where $m_p$ is derived from the difference between the azimuthal angles $\phi_0$ and $\phi_{dec,p}$.

For example:

$$m_p = 0 \quad \text{if } |\phi_{dec,p} - \phi_0| < \phi_{step}$$

$$m_p = \text{round}\left((\phi_{dec,p} - \phi_0)/\phi_{step}\right) \quad \text{otherwise}$$

where round(·) may be any rounding to integer operation.

Steps of FIGS. 7 to 9 remain the same except step 320 in which the new prediction data $PD_p$ enables to build a new candidate predictor $DPR_p$, using equation (12).

This variant of said embodiment is advantageous because it generally provides better prediction than prediction given by equation (11), and thus, it reduces the cost for encoding the integer value m, used in equation (1), and (3), in the bitstream B.

In one embodiment, the present invention may be used to improve the prediction scheme of the one chain coding/decoding scheme as described in the European patent application No. EP20306672.

In the one chain coding, the captured 3D locations are represented in a 2D coordinates (C$\phi$, $\lambda$) system together with radius values r ($r_{2D}$ or $r_{3D}$). The coordinate C$\phi$ (for coarse $\phi$) is an azimuthal angle index of the sensor head's spin whose discrete values are denoted C$\phi_i$ ($\forall i=0$ to I−1), corresponding to a effective rotation of the sensor head by an angle $\phi_i$. The coordinate $\lambda$ is a sensor index whose discrete values are denoted $\lambda_k$ ($\forall k=0$ to K−1). The radius r belongs to a continuous range of values.

For each point of the point cloud, a sensor index $\lambda$ ($\lambda$ is one of the sensor indices $\lambda_k$ ($\forall k=0$ to K−1)) associated with a sensor that captured the point, an azimuthal angle index C$\phi$ (C$\phi$ is one of the discrete angles indices C$\phi_i$ ($\forall i=0$ to I−1)) representing a capture angle of said sensor, and a radius value r of spherical coordinates of the point are obtained.

The sensor index $\lambda$ and the azimuthal angle index C$\phi$ are obtained by converting 3D cartesian coordinates (x,y,z) representing the 3D location of a captured point. These 3D cartesian coordinates (x,y,z) may be output of the sensors head. For instance, assuming that the angle $\phi_{step}$ is an elementary azimuthal angle step between two successive probing of the sensor head for a given sensor index $\lambda$, and assuming that the arc tangent values of y/x returned by function atan 2(y, x) take values in [0; 2*π] interval, C$\phi$ may be obtained by:

$$C\phi=\text{round}(\phi/\phi_{step}),$$

where $\phi$=atan 2(y, x). The rotation angle $\phi_i$ would then be obtained by:

$$\phi_i=C\phi_i*\phi_{step}.$$

In this case, the set of discrete angles $\phi_i$ (0≤i<I) is essentially defined by $\phi_i=i*\phi_{step}$.

Also, $\lambda$ may be determined as being the index $\lambda_k$ of the sensor which has an elevation angle $\theta_k$ obtained by minimizing $$\lambda = \arg\min_k \text{abs}\,(\theta_k - \theta),$$

where abs(·) is the function returning absolute value and $$\theta=z/\text{sqrt}(r),$$

where r=x*x+y*y, and sqrt(·) is the function returning the square root.

Next, the points of the point cloud are ordered based on the azimuthal angles indices C$\phi$ and the sensor indices $\lambda$.

In a variant, the points are ordered according to a lexicographic order based first on the azimuthal angle and then on the sensor index. The order index o(P) of a point P is obtained by:

$$o(P)=C\phi*K+\lambda$$

In another variant, the points are ordered according to a lexicographic order based first on the sensor index and then on the azimuthal angle. The order index o(P) of a point P is obtained by:

$$o(P)=\lambda*I+C\phi$$

Encoding ordered points into the bitstream B may comprise encoding order index difference $\Delta o_n$ representing, each, a difference between order indices of two consecutive points $P_{n-1}$ and $P_n$ (for n=2 to N):

$$\Delta o_n=o(P_n)-o(P_{n-1})$$

The order index $o(P_1)$ of the first point $P_1$ may be directly coded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first point and the order differences $\Delta o_n$, one can recursively reconstruct the order index $o(P_n)$ of any point $P_n$ by:

$$o(P_n)=o(P_{n-1})+\Delta o_n$$

Then, sensor indices $\lambda_n$ and azimuthal angle indices C$\phi_n$ associated with a point $P_n$ are obtained by:

$$\lambda_n=o(P_n)\text{modulo } K \quad (13)$$

$$C\phi_n=o(P_n)/K \quad (14)$$

where the division/K is the integer division (aka Euclidian division). Therefore, $o(P_1)$ and $\Delta o_n$ are an alternative representation of $\lambda_n$ and C$\phi_n$.

At the encoding side, a residual azimuthal angle $\phi_{res}$ is given by:

$$\phi_{res}=\phi-\phi_{pred}=\phi-C\phi_n*\phi_{step} \quad (15)$$

where $\phi_{pred}=\phi_n=C\phi_n*\phi_{step}$ is a predicted azimuthal angle.

Then, encoding ordered points into the bitstream B may also comprise encoding a residual ($r_{res}$, Q$\phi_{res,res}$) associated with ordered points given by:

$$(r_{res},Q\phi_{res,res})=(r,Q\phi_{res})-(r_{pred},Q\phi_{res,pred}) \quad (16)$$

where $r_{res}$ is a residual radius, Q$\phi_{res}$ is a quantized residual azimuthal angle, Q$\phi_{res,res}$ is a residual of quantized residual azimuthal angle and $Q\phi_{res,pred}$ is a quantized predicted residual azimuthal angle. The elevation angle $\theta_n$ for each point $P_n$ of the point cloud is not predictive encoded, it is considered to be equal to elevation angle $\theta_{\lambda_n}$ associated with the sensor index $\lambda_n$ which is determined from the order $o(P_n)$ using equation (13).

To obtain a quantized residual azimuthal angle $Q\phi_{res}$, the residual azimuthal angle $\phi_{res}$ (equation 15) may be quantized by using the adaptive quantizer $Q_\phi$ of equation (8) with a decoded radius $r_{dec}$:

$$r_{dec}=IQr_{res}+r_{pred},$$

where $IQr_{res}$ is obtained as in equation (7) from a quantized radius residual $Qr_{res}$ resulting of the adaptive quantization of the radius residual $r_{res}$ as in equation (5), and using a predicted azimuthal angle $\phi_{pred}$ equal to $\phi_n=C\phi_n*\phi_{step}$ in both equations.

In a variant, the decoded residual radius $IQr_{res}$ is obtained by:

$$IQr_{res}=IQ(Qr_{res}),$$

where $Qr_{res}=Q(r_{res})$ is uniformly quantized radius residual and where Q is an uniform quantizer and IQ is an inverse uniform quantizer.

An inverse quantized residual azimuthal angle $IQ\phi_{res}$ may be obtained by applying the adaptive inverse quantizer $IQ_\phi$ of equation (9) to the quantized residual azimuthal angles $Q\phi_{res}$, using decoded radius $r_{dec}$. A decoded residual azimuthal angle $\phi_{res,dec}$ is equal to $IQ\phi_{res}$:

$$\phi_{res,dec}=IQ\phi_{res}=IQ_\phi(Q\phi_{res},r_{dec})$$

The quantized residual radius $Qr_{res}$ is encoded in the bitstream B by the encoder so that it can be decoded by a decoder, and inverse quantized to obtain the same inverse quantized residual radius $IQr_{res}$ equal to decoded residual radius $r_{res,dec}$.

The quantized residual azimuthal angle $Q\phi_{res}$ is then predicted using a prediction of a quantized residual azimuthal angle $Q\phi_{res,pred}$ to obtain the residual of quantized residual azimuthal angle $Q\phi_{res,res}$.

$$Q\phi_{res,res}=Q\phi_{res}-Q\phi_{res,pred}$$

The residual of quantized residual azimuthal angles $Q\phi_{res,res}$ is then encoded in the bitstream B.

At the encoding side, decoded coordinates $(r_{dec},\phi_{dec}\theta_{dec})$ are then given by:

$$(r_{dec},\phi_{dec},\theta_{dec})=(IQr_{res}+r_{pred},C\phi_n*\phi_{step}+IQ\phi_{res},\theta_{\lambda_n}).$$

Encoding ordered points into the bitstream B may also comprise obtaining residual cartesian coordinates $(x_{res}, y_{res}, z_{res})$ of three-dimensional cartesian coordinates of ordered points by:

$$(x_{res},y_{res},z_{res})=(x,y,z)-(x_{pred},y_{pred},z_{pred})$$

where $(x,y,z)$ are the three-dimensional cartesian coordinates of the ordered points and $(x_{pred}, y_{pred}, z_{pred})$ are predicted cartesian coordinates obtained by:

$$\begin{cases} x_{pred} = r_{dec} * \cos(\phi_{dec}) \\ y_{pred} = r_{dec} * \sin(\phi_{dec}) \\ z_{pred} = r_{dec} * \tan(\theta_{dec}) \end{cases}$$

Residual cartesian coordinates $(x_{res}, y_{res}, z_{res})$ are quantized (Q) and quantized residual cartesian coordinates $Q(x_{res}, y_{res}, z_{res})$ are encoded into the bitstream.

Residual cartesian coordinates may be lossless coded when x,y,z quantization steps are equal to the original point precision (typically 1), or lossy coded when quantization steps are larger than the original point precision (typically quantization steps larger than 1).

Decoding points of a point cloud from a bitstream requires information such a number N of points of the point cloud, order index $o(P_1)$ of a first point in the 2D coordinates $(C\phi, \lambda)$ system, and sensor setup parameters such as the elementary azimuthal step $\phi_{step}$ or an elevation angle $\theta_k$ associated with each sensor.

At least one order index difference $\Delta o_n$ (n=2 to N) is decoded from the bitstream. Each order index difference $\Delta o_n$ is decoded for a current point $P_n$.

An order index $o(P_n)$ is obtained for a current point $P_n$ by:

$$o(P_n)=o(P_{n-1})+\Delta o_n$$

A sensor index $\lambda_n$ associated with a sensor that captured the current point and an azimuthal angle $\phi_n=C\phi_n*\phi_{step}$ representing a capture angle of said sensor are derived from the order index $o(P_n)$ (equations (13) and (14)).

A quantized residual radius $Qr_{res}$ is decoded from the bitstream B.

A decoded residual radius $r_{res,dec}=IQr_{res}$ is obtained by inverse quantizing $Qr_{res}$ using equation (7) and using a predicted azimuthal angle $\phi_{pred}$ equal to $\phi_n$ in the equations. In a variant, the decoded residual radius $r_{res,dec}=IQr_{res}$ is obtained by applying an uniform inverse quantizer to the quantized residual radius $Qr_{res}$.

A residual of quantized residual azimuthal angle $Q\phi_{res,res}$ is decoded from the bitstream B.

A quantized residual azimuthal angle $Q\phi_{res}$ is obtained by:

$$Q\phi_{res}=Q\phi_{res,res}+Q\phi_{res,pred},$$

and decoded residual azimuthal angle $\phi_{res,dec}=IQ\phi_{res}$ is obtained by inverse quantizing $Q\phi_{res}$ (equation 9).

The decoded spherical coordinates are then given by:

$$(r_{dec},\phi_{dec},\theta_{dec})=(r_{res,dec}+r_{pred},C\phi_n*\phi_{step}+\phi_{res,dec},\theta_{\lambda_n}) \quad (17)$$

Decoded cartesian coordinates $(x_{dec}, y_{dec}, z_{dec})$ are given by:

$$(x_{dec},y_{dec},z_{dec})=(x_{pred},y_{pred},z_{pred})+IQ(Q(x_{res},y_{res},z_{res}))$$

where $IQ(Q(x_{res}, y_{res}, z_{res}))$ represent inverse-quantized quantized residual cartesian coordinates that is decoded from the bitstream B.

In said embodiment of the present invention, a list of prediction data $PD_{p,\lambda}$ is maintained for each sensor index $\lambda$ according to the method of FIGS. 7 to 9 to keep prediction of the radius which highly depends on the sensor indices.

The predicted radius data $R_p$ is a predicted radius $r_{dec,p}$ equal to the radius $r_{dec}$ of a decoded point, the data $A_p$ is a prediction of the quantized residual azimuthal angle $Q\phi_{res,pred,p}$ equal to the quantized residual $Q\phi_{res,dec}$ of said decoded point (see step 320 below).

In step 110 and 220, a candidate predictor $DPR_{p,\lambda_n}$ derived from a list of prediction data associated with the sensor index $\lambda_n$ is then given by:

$$DPR_{p,\lambda_n}=(r_{dec,p},Q\phi_{res,pred,p}) \quad (18)$$

where $r_{dec,p}$ is the predicted radius and $Q\phi_{res,pred,p}$ is the prediction of the quantized residual azimuthal angle given by the predictor $DPR_{p,\lambda_n}$.

Thus $r_{pred}$ of equation (16) is equal to $r_{dec,p}$.

The residual of quantized residual azimuthal angle $Q\phi_{res,res}$ is then obtained by using equation (16) with $Q\phi_{res,pred}=Q\phi_{res,pred,p}$:

$$Q\phi_{res,res}=Q\phi_{res}-Q\phi_{res,pred,p}.$$

A residual ($Qr_{res}$, $Q\phi_{res,res}$), comprising a quantized residual radius, obtained (as previously described) using an adaptive quantization, or in a variant uniform quantization, of a residual radius, and a residual of quantized residual azimuthal angle, is encoded in the bitstream B at the encoder side and is decoded from bitstream B at decoder side. In both encoder and decoder, a decoded radius residual $r_{res,dec}=IQr_{res}$ is obtained by inverse quantization of the quantized radius residual, and a decoded radius $r_{dec}$ is obtained by adding $r_{res,dec}$ to the predicted radius, $r_{dec,p}$:

$$r_{dec}=r_{res,dec}+r_{dec,p}.$$

A decoded quantized azimuthal angle residual $Q\phi_{res,dec}$ (equal to $Q\phi_{res}$) is obtained by adding the residual of quantized residual azimuthal angle $Q\phi_{res,res}$ with the prediction of the quantized residual azimuthal angle $Q\phi_{res,pred,p}$:

$$Q\phi_{res,dec}=Q\phi_{res,res}+Q\phi_{res,pred,p}=Q\phi_{res}$$

And a decoded residual azimuthal angle residual $\phi_{res,dec}$ is obtained by applying the adaptive inverse quantizer $IQ_\phi$ of equation (8) to the decoded quantized azimuthal angle residual $Q\phi_{res,dec}$, using decoded radius $r_{dec}$:

$$\phi_{res,dec}=IQ\phi_{res,dec}=IQ_\phi(Q\phi_{res,dec},r_{dec})=IQ\phi_{res}$$

The decoded spherical coordinates are then given by:

$$(r_{dec},\phi_{dec},\theta_{dec})=(r_{res,dec}+r_{dec,p},C\phi_n*\phi_{step}+\phi_{res,dec},\theta_{\lambda_n}).$$

In steps 140 and 250, the list of prediction data is updated based on the decoded residual radius $r_{res,dec}$.

In step 320, the new prediction data comprises the radius $r_{dec}$ (in predicted radius data $R_p$) and the quantized residual azimuthal angle $Q\phi_{res,dec}$ (in data $D_p$) of the decoded current point. Thus, the new prediction data $PD_p$ enables to build a new candidate predictor $DPR_{p,\lambda_n}$ from $r_{dec,p}$ and $Q\phi_{res,pred,p}$ which are set equal to the radius and quantized residual azimuthal angle that have just been decoded: $r_{dec}$ and $Q\phi_{res,dec}$.

In a variant, a decoded radius $r_{dec}$ is obtained in both an encoder and a decoder by applying the adaptive inverse quantizer of equation (7) on a quantized radius Qr instead of a quantized radius residual, with $\phi_{pred}$ equal to $\phi_n$:

$$r_{dec}=IQ_r(Qr,\phi_n) \quad (19)$$

Qr is obtained using quantizer $Q_r$ of equation (5), with $\phi_{pred}$ equal to $\phi_n$, thus applying $Q_r$ on a radius r instead of a radius residual:

$$Qr=Q_r(r,\phi_n). \quad (20)$$

In that variant, as will be detailed below, rather than using a predicted radius to perform a prediction of a radius, a predicted quantized radius is used instead, to perform a prediction of quantized radius. Then, the predicted radius data $R_p$ is a predicted quantized radius $Qr_p$ equal to the quantized radius Qr of a decoded point and the data $A_p$ is still a quantized residual azimuthal angle $Q\phi_{res,pred,p}$ equal to the quantized residual $Q\phi_{res,dec}$ of said decoded point.

In that variant, in step 110 and 220, a candidate predictor $DPR_{p,\lambda_n}$ derived from a list of prediction data associated with the sensor index $\lambda_n$ is given by:

$$DPR_{p,\lambda_n}(Qr_p,Q\phi_{res,pred,p}) \quad (21)$$

where $Qr_p$ is the predicted quantized radius and $Q\phi_{res,pred,p}$ is the prediction of the quantized residual azimuthal angle $Q\phi_{res}$ given by the predictor $DPR_{p,\lambda_n}$.

In that variant, the residual radius $r_{res}$ is then equal to $Qr_{res}$ the residual of the quantized radius given by:

$$r_{res}=Qr_{res}=Qr-Qr_p$$

where Qr is the quantized radius of a point given by equation (20) and $Qr_p$ is a predicted radius of said quantized radius.

A residual ($Qr_{res}$, $Q\phi_{res,res}$), comprising a quantized residual radius and a residual of quantized residual azimuthal angle, is encoded in the bitstream B at the encoder side and is decoded from bitstream B at decoder side.

In both encoder and decoder, a decoded quantized radius $Qr_{dec}=Qr$ is obtained by adding the quantized radius residual $Qr_{res}$ to the predicted quantized radius $Qr_p$:

$$Qr_{dec}=Qr_{res}+Qr_p=Qr,$$

and a decoded radius $r_{dec}$ is obtained by inverse quantization of the quantized radius residual, using equation (19).

In step 320, the new prediction data comprises the quantized radius $Qr_{dec}$ (in predicted radius data $R_p$) and the quantized residual azimuthal angle $Q\phi_{res,dec}$ (in data $D_p$) of the decoded current point. Thus, the new prediction data $PD_p$ enables to build a new candidate predictor $DPR_{p,\lambda_n}$ from $Qr_p$ and $Q\phi_{res,dec,p}$ which are set equal to the quantized radius and quantized residual azimuthal angle that have just been decoded: $Qr_{dec}$ and $Q\phi_{res,dec}$.

The present encoding/decoding method can be used to encode/decode the point cloud which may be used for various purposes, to improve the compression performance of the point cloud, for example, the total bitrate to encode/decode the point cloud data can be improved.

For example, in a use case in terms of the transmission of sparse geometry data captured by a spinning sensor head mounted on a moving vehicle, the encoding/decoding method may be used to encoding/decoding a point cloud representing an obstacle object. Each point of the point cloud is associated with a radius representing a distance of the point from a referential of the spinning sensor head. Each point of the point cloud may correspond to a point on the obstacle object. A dynamic list of prediction data used to derive a predictor for encoding geometry data of points is determined, which initially comprises a data representative a predetermined minimal radius value extracted from all the points of the point cloud, for example the radius value of the point on the obstacle object closest to the referential of the spinning sensor head in this use case. During the encoding, the data representative of the prediction data from which the derived predictor is derived and a residual radius data are encoded in a bitstream, in which the residual radius data is data between the data representative of the radius of the point and a predicted radius data derived from the predictor. During the decoding, the data representative of the prediction data and the residual radius data are decoded from the bitstream, and then the predicted radius data can be derived from the predictor which is derived from the data representative of the prediction data, and then the data representative of the radius of the point can be derived from the residual radius data and the predicted radius data. During the encoding or decoding of points, predicting data are updated based on residual radius data representative of residual radius of the points. In the use case, for example, the bitstream may be transmitted to a cloud by an encoder mounted on a moving vehicle and then obtained by the decoder on a data processing server, or the bitstream may be transmitted directly to the data processing server, such that the geometry data of the obstacle object captured by the moving vehicle may be transmitted to the data processing server for subsequent processing, for example deciding a driving path for the moving vehicle. Further, since the dynamic list of prediction data allows to keep track of various object distances and produces a more efficient prediction, the total bitrate to encode the data can be improved.

Figure 10:
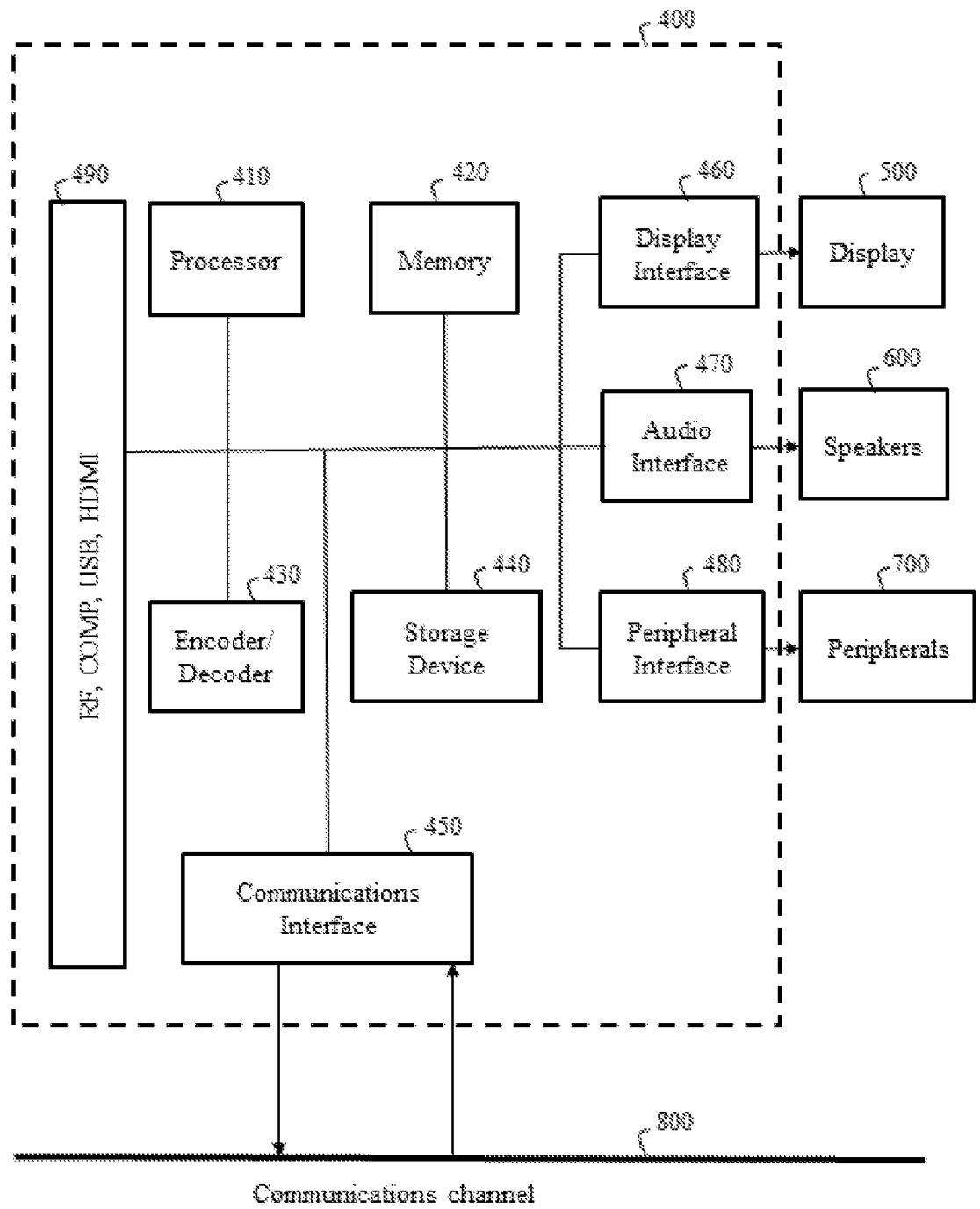
FIG. 10 illustrates a schematic block diagram of an example of a system in which various aspects and embodiments are implemented.

FIG. 10 shows a schematic block diagram illustrating an example of a system in which various aspects and embodiments are implemented.

System 400 may be embedded as one or more devices including the various components described below. In various embodiments, the system 400 may be configured to implement one or more of the aspects described in the present application.

Examples of equipment that may form all or part of the system 400 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 400, singly or in combination, may be embodied in a single integrated circuit (IC), multiple ICs, and/or discrete components. For example, in at least one embodiment, the processing and encoder/decoder elements of system 400 may be distributed across multiple ICs and/or discrete components. In various embodiments, the system 400 may be communicatively coupled to other similar systems, or to other electronic devices, via, for example, a communications bus or through dedicated input and/or output ports.

The system 400 may include at least one processor 410 configured to execute instructions loaded therein for implementing, for example, the various aspects described in the present application. Processor 410 may include embedded memory, input output interface, and various other circuitries as known in the art. The system 400 may include at least one memory 420 (for example a volatile memory device and/or a non-volatile memory device). System 400 may include a storage device 440, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 440 may include an internal storage device, an attached storage device, and/or a network accessible storage device, as non-limiting examples.

The system 400 may include an encoder/decoder 430 configured, for example, to process data to provide encoded/decoded point cloud geometry data, and the encoder/decoder 430 may include its own processor and memory. The encoder/decoder 430 may represent hardware and/or software that may be included in a device to perform the encoding and/or decoding functions. As is known, a device may include one or both of the encoding and decoding modules. Additionally, encoder/decoder 430 may be implemented as a separate element of system 400 or may be incorporated within processor 410 as a combination of hardware and software as known to those skilled in the art.

Program code to be loaded onto processor 410 or encoder/decoder 430 to perform the various aspects described in the present application may be stored in storage device 440 and subsequently loaded onto memory 420 for execution by processor 410. In accordance with various embodiments, one or more of processor 410, memory 420, storage device 440, and encoder/decoder 430 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 410 and/or the encoder/decoder 430 may be used to store instructions and to provide working memory for processing that may be performed during encoding or decoding.

In other embodiments, however, a memory external to the processing device (for example, the processing device may be either the processor 410 or the encoder/decoder 430) may be used for one or more of these functions. The external memory may be the memory 420 and/or the storage device 440, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 400 may be provided through various input devices as indicated in block 490. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 490 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream may be provided to various processing elements, including, for example, processor 410, and encoder/decoder 430 operating in combination with the memory and storage elements to process the data stream as necessary for presentation on an output device.

Various elements of system 400 may be provided within an integrated housing. Within the integrated housing, the various elements may be interconnected and transmit data therebetween using suitable connection arrangement, for example, an internal bus as known in the art, including the I2C bus, wiring, and printed circuit boards.

The system 400 may include communication interface 450 that enables communication with other devices via communication channels 800. The communications interface 450 may include, but is not limited to, a transceiver configured to transmit and to receive data over communications channel 800. The communications interface 450 may include, but is not limited to, a modem or network card and the communication channel 800 may be implemented, for example, within a wired and/or a wireless medium.

Data may be streamed to the system 400, in various embodiments, using a Wi-Fi network such as IEEE 802.11. The Wi-Fi signal of these embodiments may be received over the communications channel 800 and the communications interface 450 which are adapted for Wi-Fi communications. The communications channel 800 of these embodiments may be typically connected to an access point or router that provides access to outside networks including the Internet for allowing streaming applications and other over-the-top communications.

Other embodiments may provide streamed data to the system 400 using a set-top box that delivers the data over the HDMI connection of the input block 490.

Still other embodiments may provide streamed data to the system 400 using the RF connection of the input block 490.

The streamed data may be used as a way for signaling information used by the system 400. The signaling information may comprise the bitstream B and/or information such the data DA, a number of points of a point cloud, coordinates or order $o(P_1)$ of a first point in the 2D coordinates $(C\phi, \lambda)$ system and/or sensor setup parameters such as such as an elementary azimuthal step $\phi_{step}$ or an elevation angle $\theta_k$ associated with a sensor of the spinning sensor head 10.

It is to be appreciated that signaling may be accomplished in a variety of ways. For example, one or more syntax elements, flags, and so forth may be used to signal information to a corresponding decoder in various embodiments.

The system 400 may provide an output signal to various output devices, including a display 500, speakers 600, and other peripheral devices 700. The other peripheral devices 700 may include, in various examples of embodiments, one or more of a stand-alone DVR, a disk player, a stereo system, a lighting system, and other devices that provide a function based on the output of the system 400.

In various embodiments, control signals may be communicated between the system 400 and the display 500, speakers 600, or other peripheral devices 700 using signaling such as AV.Link (Audio/Video Link), CEC (Consumer Electronics Control), or other communications protocols that enable device-to-device control with or without user intervention.

The output devices may be communicatively coupled to system 400 via dedicated connections through respective interfaces 460, 470, and 480.

Alternatively, the output devices may be connected to system 400 using the communications channel 800 via the communications interface 450. The display 500 and speakers 600 may be integrated in a single unit with the other components of system 400 in an electronic device such as, for example, a television.

In various embodiments, the display interface 460 may include a display driver, such as, for example, a timing controller (T Con) chip.

The display 500 and speaker 600 may alternatively be separate from one or more of the other components, for example, when the RF portion of input 490 is part of a separate set-top box.

In various embodiments in which the display 500 and speakers 600 may be external components, the output signal may be provided via dedicated output connections, including, for example, HDMI ports, USB ports, or COMP outputs.

In FIG. 1-10, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even when only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 410 or by hardware, or by a combination of hardware and software. As a non-limiting example, the embodiments may be also implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood u that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer to entropy decoding, in another embodiment "decoding" may refer only to differential decoding, and in another embodiment "decoding" may refer to combinations of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to entropy encoding, in another embodiment "encoding" may refer only to differential encoding, and in another embodiment "encoding" may refer to combinations of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory or bitstream), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory or bitstream). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a data DA, a number of points of the point cloud or coordinates or order $o(P_1)$ of a first point in the 2D coordinates $(C\phi, \lambda)$ system or sensor setup parameters such as the elementary azimuthal step $\phi_{step}$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, when the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, each point of the point cloud being associated with at least a radius responsive to a distance of the point from a referential, the method comprising:
   selecting (110) a predictor of at least a predicted radius data representative of a radius of a point of the point cloud from at least one predictor derived from a list of at least one prediction data;
   encoding (120), in the bitstream, a data representative of a prediction data from which the selected predictor is derived;
   encoding (130), in the bitstream, residual radius data between a data representative of the radius of the point and a predicted radius data derived from the selected predictor; and
   updating (140) said at least one prediction data based on the residual radius data.

2. The method of claim 1, wherein updating said at least one prediction data based on the residual radius data is based on a comparison of the residual radius data with a threshold.

3. The method of claim 2, wherein updating said at least one prediction data based on the residual radius data comprises:
   when the residual radius data is greater than the threshold, a new prediction data derived from at least the residual radius data is added to the top of the list of at least one prediction data; and
   when the residual radius data is lower than the threshold, the prediction data from which the selected predictor is derived, or the prediction data associated with the data representative of a prediction data of a list of at least one prediction data from which a predictor of at least a predicted radius data representative of a radius of a point of the point cloud is derived, is updated based on at least the radius residual data, and the updated prediction data is moved to the top of the list of at least one prediction data.

4. The method of claim 3, wherein when the residual radius data is greater than the threshold and when a maximum number of prediction data of the list of at least one prediction data is reached, the last prediction data of the list of at least one prediction data is removed from the list of at least one prediction data.

5. The method of claim 1, wherein the predicted radius data of a prediction data is a radius of a decoded point of the point cloud and said prediction data further comprises an azimuthal angle of said decoded point, and a predictor comprising said predicted radius data and said azimuthal angle.

6. The method of claim 5, wherein the azimuthal angle of the predictor represents a sum of the azimuthal angle of said decoded point with an integer number of elementary azimuthal steps.

7. The method of claim 1, wherein the predicted radius data of a prediction data is a radius of a decoded point of the point cloud and said prediction data further comprises a quantized residual azimuthal angle associated with said decoded point, and a predictor comprising said predicted radius data and said quantized residual azimuthal angle.

8. The method of claim 1, wherein the predicted radius data of a prediction data is a quantized radius of a decoded point and said prediction data further comprises a quantized residual azimuthal angle associated with said decoded point, and a predictor comprising said predicted radius data and said quantized residual azimuthal angle.

9. The method of claim 1, wherein a list of spherical coordinate predictors is associated with each sensor of a spinning sensor head used for capturing the points of the point cloud.

10. An apparatus of encoding a point cloud into a bitstream of encoded point cloud data representing a physical object, each point of the point cloud being associated with at least a radius responsive to a distance of the point from a referential, the apparatus comprising one or more processors configured to:
    selecting a predictor of at least a predicted radius data representative of a radius of a point of the point cloud from at least one predictor derived from at least one prediction data;
    encoding, in the bitstream, a data representative of a prediction data from which the selected predictor is derived;
    encoding, in the bitstream, residual radius data between a data representative of the radius of the point and a predicted radius data derived from the selected predictor; and
    updating said at least one prediction data based on the residual radius data.

11. The method of decoding a point cloud from a bitstream of encoded point cloud data representing a physical object, each point of the point cloud being associated with at least a radius responsive to a distance of the point from a referential, the method comprising:
    decoding (210), from the bitstream, a data representative of a prediction data of a list of at least one prediction data from which a predictor of at least a predicted radius data representative of a radius of a point of the point cloud is derived;
    deriving (220) a predicted radius data of the point from the predictor;
    decoding (230), from the bitstream, residual radius data of the point;
    deriving (240) a data representative of the radius of the point from the residual radius data and the predicted radius data; and
    updating (250) said at least one prediction data based on the residual radius data.

12. The method of claim 11, wherein updating said at least one prediction data based on the residual radius data is based on a comparison of the residual radius data with a threshold.

13. The method of claim 12, wherein updating said at least one prediction data based on the residual radius data comprises:
    when the residual radius data is greater than the threshold, a new prediction data derived from at least the residual radius data is added to the top of the list of at least one prediction data; and
    when the residual radius data is lower than the threshold, the prediction data from which the selected predictor is derived, or the prediction data associated with the data representative of a prediction data of a list of at least one prediction data from which a predictor of at least a predicted radius data representative of a radius of a point of the point cloud is derived, is updated based on at least the radius residual data, and the updated prediction data is moved to the top of the list of at least one prediction data.

14. The method of claim 13, wherein when the residual radius data is greater than the threshold and when a maximum number of prediction data of the list of at least one prediction data is reached, the last prediction data of the list of at least one prediction data is removed from the list of at least one prediction data.

15. The method of claim 11, wherein the predicted radius data of a prediction data is a radius of a decoded point of the point cloud and said prediction data further comprises an azimuthal angle of said decoded point, and a predictor comprising said predicted radius data and said azimuthal angle.

16. The method of claim 15, wherein the azimuthal angle of the predictor represents a sum of the azimuthal angle of said decoded point with an integer number of elementary azimuthal steps.

17. The method of claim 11, wherein the predicted radius data of a prediction data is a radius of a decoded point of the point cloud and said prediction data further comprises a quantized residual azimuthal angle associated with said decoded point, and a predictor comprising said predicted radius data and said quantized residual azimuthal angle.

18. The method of claim 11, wherein the predicted radius data of a prediction data is a quantized radius of a decoded point and said prediction data further comprises a quantized residual azimuthal angle associated with said decoded point, and a predictor comprising said predicted radius data and said quantized residual azimuthal angle.

19. An apparatus of decoding a point cloud from a bitstream of encoded point cloud data representing a physical object, each point of the point cloud being associated with at least a radius responsive to a distance of the point from a referential, the apparatus comprising one or more processors configured to perform the method of claim 11.

20. A non-transitory storage medium carrying instructions of program code for executing a method of claim 11.

* * * * *